(12) United States Patent
Schneider et al.

(10) Patent No.: US 7,512,944 B2
(45) Date of Patent: Mar. 31, 2009

(54) BROKERS FOR MANAGING COMPUTER-IMPLEMENTED INSTALLATIONS

(75) Inventors: Manfred Schneider, Nussloch (DE); Erol Bozar, Pforzheim (DE)

(73) Assignee: SAP Aktiengesellschaft, Waldrof (DE)

( * ) Notice: Subject to any disclaimer, the term of this patent is extended or adjusted under 35 U.S.C. 154(b) by 939 days.

(21) Appl. No.: 10/892,548

(22) Filed: Jul. 15, 2004

(65) Prior Publication Data
US 2006/0015865 A1    Jan. 19, 2006

(51) Int. Cl.
*G06F 9/445* (2006.01)
(52) U.S. Cl. .................................. 717/178; 717/175
(58) Field of Classification Search ........................ None
See application file for complete search history.

(56) References Cited

U.S. PATENT DOCUMENTS

| | | | |
|---|---|---|---|
| 6,067,582 A * | 5/2000 | Smith et al. ............... 710/5 |
| 6,195,678 B1 * | 2/2001 | Komuro ................... 709/202 |
| 6,282,711 B1 * | 8/2001 | Halpern et al. ............ 717/175 |
| 6,725,453 B1 | 4/2004 | Lucas et al. ............... 717/178 |
| 6,751,795 B1 | 6/2004 | Nakamura ................. 717/174 |
| 6,754,896 B2 | 6/2004 | Mishra et al. ............. 717/176 |
| 6,772,192 B1 | 8/2004 | Fulton et al. .............. 709/203 |
| 6,789,215 B1 | 9/2004 | Rupp et al. .................. 714/38 |
| 7,249,354 B2 * | 7/2007 | Tigani et al. ............... 717/177 |
| 2003/0018964 A1 * | 1/2003 | Fox et al. .................. 717/177 |

* cited by examiner

*Primary Examiner*—Michael J Yigdall
(74) *Attorney, Agent, or Firm*—Fish & Richardson P.C.

(57) ABSTRACT

Methods and apparatus, including computer program products, for delivering resources for installation on a machine involves receiving a first request from one or more installer components requesting one or more requested installation resources. A second request is sent, in response to the first request, for the one or more requested installation resources to multiple service providers. One or more installation resources are obtained from the service providers. The obtained installation resources correspond to the requested installation resources and are obtained as a result of the second request. The obtained installation resources are delivered to the installer components.

19 Claims, 4 Drawing Sheets

BROKERS FOR MANAGING COMPUTER-IMPLEMENTED INSTALLATIONS

BACKGROUND

The present invention relates to data processing by digital computer, and more particularly to brokers for managing computer-implemented installations.

Desktop computers, mainframes, servers, and other types of general-purpose computers, and some types of special purpose computers, generally rely upon some type of installed software to be able to provide a variety of functions to users. Typically, many different kinds of software supporting many different functions can be installed on such a computer. Software that can be installed may include operating systems, application programs, extensions, and other types of resources, which each may include one or more installable units or components. An installable unit may reside on an external medium, such as a CD; in a local memory, such as a hard drive, associated with the computer; in a local network, such as in a file system directory; or remotely, such as on a file share server, a hypertext transfer protocol (HTTP) server, or an file transfer protocol (FTP) server.

Regardless of the location of the installable unit, an installer located on the computing system onto which the installable unit is to be installed is used to retrieve and install the installable unit. An installer is a utility program that facilitates or eases the installation of another application. Installers typically allow the user to select desired configuration options for the application installation or to use default configuration settings, set up corresponding initialization files, and copy the application to a hard disk on the computing system. The installer knows exactly what components it needs for the installation, where the components are located, and how to retrieve the components. In some cases, an uninstaller may be included as part of the installer program or as a separate program to enable users to reverse or remove the different files that are modified or generated during the installation process.

SUMMARY OF THE INVENTION

The present invention provides methods and apparatus, including computer program products, that implement techniques for delivering resources for installation on a machine.

In one general aspect, the techniques feature delivering resources for installation on a machine by receiving a first request from one or more installer components for one or more requested installation resources. A second request is sent, in response to the first request, for the requested installation resources to multiple service providers. Installation resources that correspond to the requested installation resources are obtained from the service providers as a result of the second request. The obtained installation resources are then delivered to the requesting installer components.

The invention can be implemented to include one or more of the following advantageous features. The first request identifies parameters for defining the installation resources and the installation resources comply with the parameters. An installer negotiates with one or more of the service providers to provide installation resources that comply with the parameters. A message is sent to the installer to solicit an approval through a user interface of negotiated terms for providing the installation resources. The installation resources are obtained by receiving service offers relating to the installation resources, and one or more of the service offers are accepted for each of the installation resources. The installer components are separate installers that generate separate requests for installation resources, and the separate requests collectively form the first request. The installation resources corresponding to each of the separate requests are bundled for delivery to the installer components.

The requested installation resources are separable resources, and the installation resources are obtained by obtaining a first subset of the installation resources from a first service provider and obtaining a second subset of the installation resources from a second service provider, which are delivered bundled together. The installation resources are obtained only after determining that all of the requested installation resources can be obtained. One or more installation resources are stored in a cache, and a third request for installation resources is received from an installer component. A determiniation is made that the third request can be at least partially fulfilled using one or more of the stored installation resources, and the stored installation resources are retrieved for delivery to the installer component in response to the third request. The installation resources are obtained in connection with an authorization to distribute multiple copies of the stored installation resources.

The installation resources are obtained from multiple sources. Each source is one of the remote service providers or a local storage. Negotiations are conducted with the remote service providers by sending parameters relating to requested installation resources to a remote service provider, receiving an offer defining an available installation resource, and sending a request to modify the offer. The installer component or the first request is validated and payment information for the installation resources is managed by the installer component. Installation resources are cached for delivery to installer components in response to subsequent requests for particular installation resources.

The requested installation resources are defined by mandatory parameters defining required features of the requested installation resources and optional parameters defining preferred features of the requested installation resources. Negotiations are conducted with the service providers to obtain installation resources including the required features and to attempt to obtain installation resources including at least a portion of the preferred features.

The invention can be implemented to realize one or more of the following advantages. Installation brokers can dynamically provide installation resources, for example, to provide the most up-to-date installation resources, to provide installation resources on the most beneficial terms, and/or to identify specific installation resources that meet general criteria specified by an installer or installer component. Installers can be decoupled from installation resource providers, for example, to mask the installer identify from the installation resource provider and vice versa and to enable the broker to provide more centralized control of validation, accounting, and/or monitoring functions. Installation resources can be selected among multiple potential sources, and the broker can mediate between a target device and the multiple sources. The broker can further negotiate with the multiple sources to obtain appropriate installation resources. The broker can cache installation resources for delivery to installers. Brokers can also transform or repackage installation resources to place the resources in a different format before delivering the installation resources to the installer and can abort the delivery process if one or more of the requested installation resources are unavailable. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
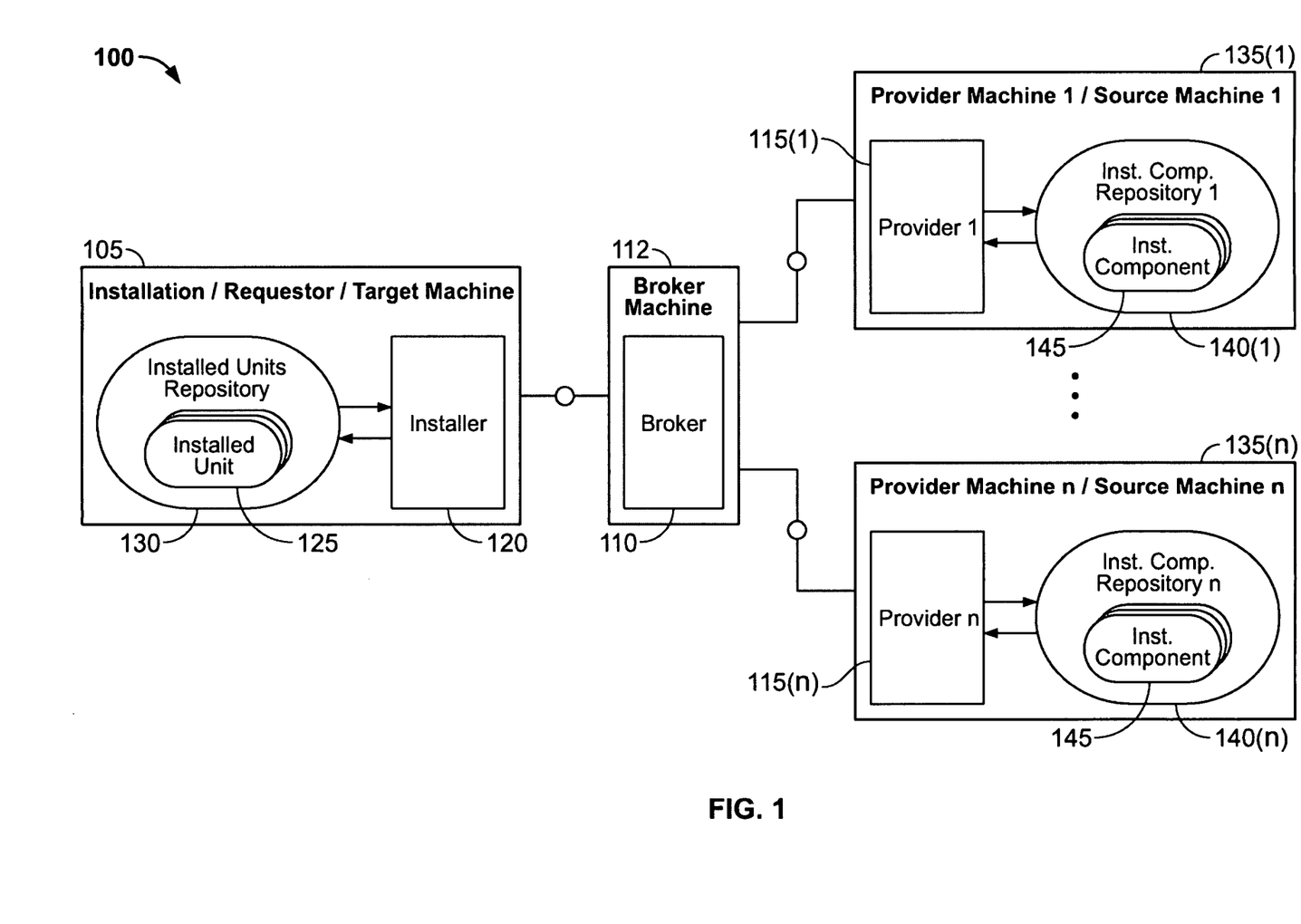
FIG. 1 is a block diagram of an exemplary system for installing resources in accordance with the invention.

As shown in FIG. 1, an exemplary system 100 for installing resources includes a target device 105, a broker 110, and multiple service providers 115. The target device 105 includes one or more installers 120 for installing components on the target device 105. The installer 120 installs installable units 125, such as application components, in an installed units repository 130 (e.g., a hard drive) on the target device 105. In some implementations, the target device 105 can include multiple installers 120 that are operable, for example, to install different applications or other resources and/or components from different sources. The target device 105 also may not include a complete installer 120 but, instead, may include installer components that are used to obtain additional installation resources, such as one or more complete installers, installer components, installable units, or any other installation resources. For example, the installer components located on the target device 105 can be simply a utility program for identifying a need for a complete installer. In another alternative, the installer 120 or installer components can be located on a different (e.g., remote) device from the target device 105.

The installer 120 or installer components generally are implemented in software, which is executed to determine whether additional installation resources, beyond any installation resources already available to the installer 120 or installer components, are needed. Instead of obtaining installation resources from a known location, as in conventional installation procedures, the installer 120 delegates the task of obtaining installation resources to the broker 110. The broker 110 can be located in a broker device 112, which can be one or more servers, for example, that act as the broker 110 for obtaining needed installation resources.

The installer 120 sends a message to the broker 110 requesting one or more installation resources. The broker 110 receives the request message and in turn communicates with one or more service providers 115 to identify and select service providers 115 that are capable of providing the requested installation resources. Once one or more service providers 115 are selected, the broker 110 instructs the selected service providers 115 to deliver particular installation resources to the broker 110. The broker 110 can perform some operations on (or using) the installation resources it receives before delivering the installation resources to the target device 105 and/or installer 120 or installer components.

In some implementations, the broker 110 can be located on the same target device 105 as the installer 120 but implemented in a separate software module than the installer 120.

The broker 110 can provide additional functionalities, such as validation, payment, and monitoring services for one or more target devices 105, installers, and/or service providers 115. Validation services can include authentication of a user or device, authorization of the user or device to use certain services, and access control to prevent unauthorized access to services. Payment services can include pricing, accounting, leasing, and/or licensing services.

The service providers 115 are located in respective source devices 135. In response to a request for installation resources, each service provider 115 queries a corresponding installable component repository 140 to determine whether the repository 140 includes an installable component 145 that fulfills the requirements of one or more of the requested installation resources. Generally, the broker 110 communicates with the source devices 135 and/or service providers 115 using a network (not shown), such as a local area network or a wide area network (i.e., the Internet). Similarly, the target device 105 and/or installer 120 can communicate with the broker 110 using a network.

In requesting installation resources from the service providers 115, the broker 110 can specify parameters, such as properties, constraints, policies, delivery conditions, pricing, licensing terms, delivery format, schedule, and the like, for the requested installation resources. The service providers 115 each determine if they can fulfill the requests and the associated parameters and respond to the broker 110. The response serves as a bid on the request and generally identifies the installation resources that the service provider 115 can provide and any additional conditions, policies, and the like associated with the proposed delivery of the installation resources. If the broker 110 responds with an acceptance of the bid, the service provider 115 delivers the requested installation resources to the broker 110.

In some implementations, the broker 110 can receive multiple bids from different service providers 115 for the same or similar installation resources. The broker 110 can select among the multiple bids to obtain relatively favorable terms and/or can negotiate with the one or more of the various service providers 115 to obtain alternative or additional bids on installation resources with modified parameters or to obtain more favorable terms. The broker 110 can also obtain subsets of the overall set of requested installation resources from different service providers 115.

As an example, the broker 110, in response to a request for three installation resources A, B, and C from an installer 120, sends a request identifying the requested installation resources and defining certain parameters to multiple service providers 115. A first service provider 115(1) responds with a bid for providing two of the requested installation resources A and B, while another service provider 115(n) responds with a bid for providing a different two of the requested installation resources B and C. As a result, the broker 110 is unable to obtain all three of the requested installation resources from a single source. The broker 110 can obtain all of the requested installation resources but, if it accepts the current bids, will obtain two copies of the installation resource B that is common between the two bids. Accordingly, the broker 110 negotiates with the first service provider 115(1) to obtain a bid for the installation resource A that is unavailable from the other service provider 115(n) and likewise negotiates with the other service provider 115(n) to obtain a bid for the installation resource C that is unavailable from the first service provider 115(1). In this manner, the broker 110 can compare alternative ways of assembling the requested installation resources A, B, and C to provide the most cost-effective solution or the most beneficial terms.

Even in cases where the broker 110 can obtain all of the requested installation resources from a single source, it may be desirable to negotiate to determine if an alternative way of assembling the requested installation resources provides a more beneficial result. In addition, the broker 110 can perform negotiations with the service providers 115 other than simply requesting bids for fewer installation resources.

Figure 2:
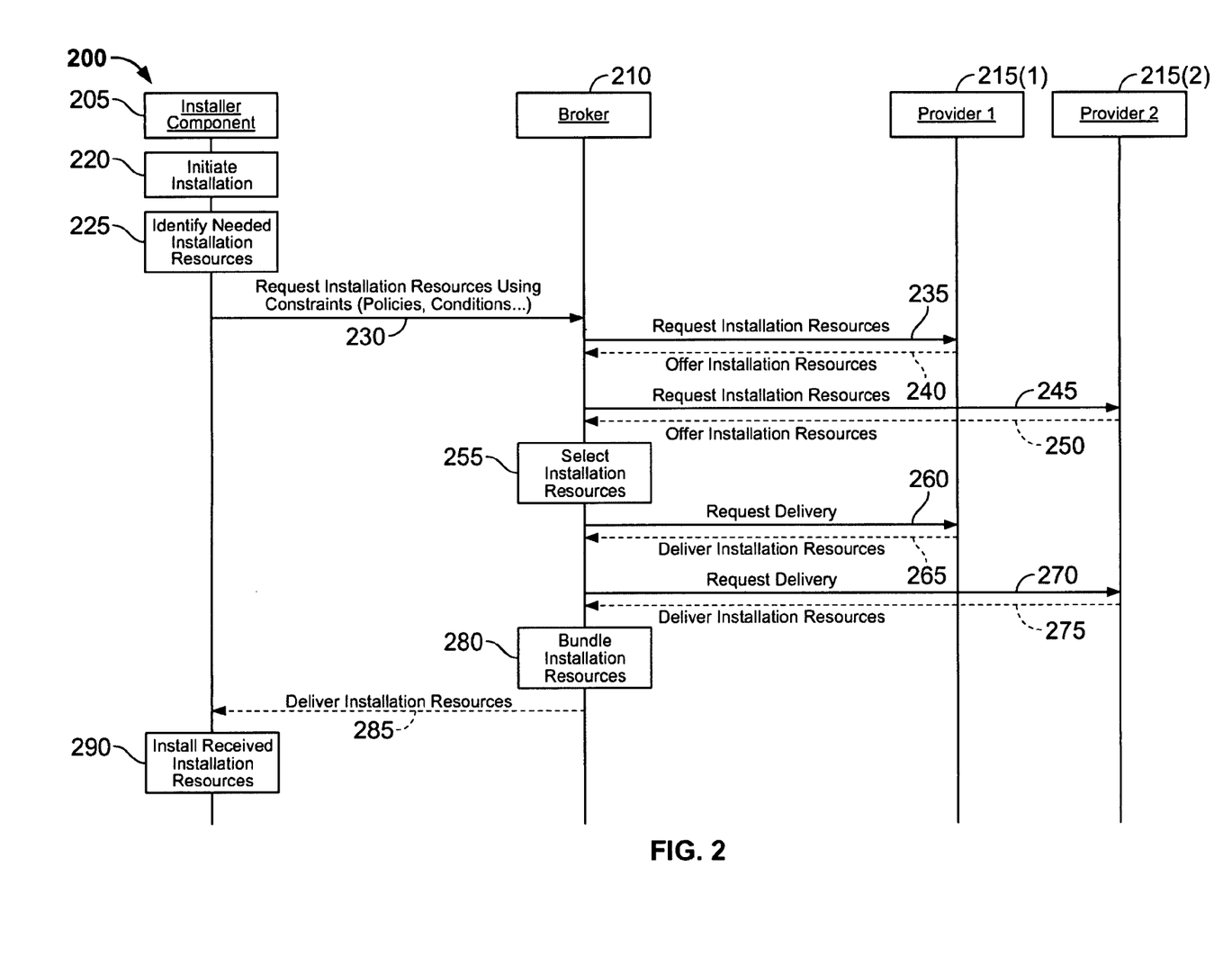
FIG. 2 is a signaling and flow diagram of a process for obtaining installation resources using a broker.

FIG. 2 is a signaling and flow diagram of a process 200 for obtaining installation resources using a broker (e.g., broker 110). An installer component 205 initiates an installation of an application or other resource (220). The installer component 205 identifies a need for additional installation resources (225). For example, the installer component 205 determines that an installation resource that is not available in local memory is needed. Accordingly, the installer component 205 sends a request 230 for installation resources to a broker 210. The installation resources request 230 includes parameters, such as constraints, policies, and the like, that further define the desired installation resources. Policies can be used to guide the broker and to express specific requirements and requests (e.g., "this component must run on Windows XP, Service Pack 1" or "I prefer a component which uses at most 1 GB or RAM").

In response to the installation resources request 230, the broker 210 sends a corresponding request 235 to a first provider 215(1), which responds with an offer 240 for installation resources. The offer 240 can be an offer to provide all of the installation resources requested by the installer component 205 or only a subset of the requested installation resources.

The broker 210 sends a second request 245 to a second provider 215(2). The second request 245 can be a request for all of the installation resources requested by the installer component 205 or can be a request for only the installation resources that are not offered by the first provider 215(1). The second provider 215(2) responds with an offer 250 for installation resources. Again, the offer 250 can be an offer to provide all of the requested installation resources or only a subset of the requested installation resources.

The offers 240 and 250 can include metadata defining policies (e.g., maximum price, latest delivery schedule, minimum quality, operating system or database platform, average resource consumption, and the like), conditions, pricing, and the like for the offered installation resources. If the broker 210 is unable to obtain all of the installation resources, the broker 210 can cancel the requests 235 and 245 for installation resources and inform the installer component 205 that the requested installation resources are unavailable.

After analyzing the offers 240 and 250, the broker 210 selects particular offered installation resources (255) and sends messages 260 and 270 accepting the offers 240 and 250 (or portions thereof) by requesting delivery of the selected installation resources. The first provider 215(1) and the second provider 215(2) deliver the selected installation resources in response messages 265 and 275. The broker 210 bundles the installation resources received from the providers 215 for delivery to the installer component 205 (280). The broker 205 then delivers the bundled installation resources to the installer component 205 in a response 285 to the original request 230 for installation resources. The installer component 205 installs the received installation resources (290).

In some implementations, the installer component 205 can request abstract installation resources (e.g., a resource that implements a particular standard, such as ISO/IEC 9075 or SQL-92, or a resource that complies with a particular specification, such as JSR-151 J2EE 1.4). The broker 210 can transform the request for abstract installation resources into a request for specific installation resources using information associated with the broker 210 or using information obtained in response to requests sent to various providers 215. The broker 210 receives the abstract installation request and determines which specific installation resources can fulfill the request. For example, if the installer component requests a relational database compliant to SQL-92, the broker 210 might determine that MaxDB is an appropriate relational database among multiple different possible relational databases.

Instead of simply accepting installation resources as offered by the providers 215, the broker 210 can negotiate commercial and/or technical aspects associated with provisioning the installation resources. After receiving the offers 240 and 250, for example, the broker 210 can request that certain aspects of the offers 240 and 250 be modified. The commercial and technical aspects, such as price, delivery conditions, support agreements, guaranteed qualities, interface specifications, etc., associated with the installation resources can be defined by, for example, policies, properties, conditions, constraints, context information, etc. The negotiations can involve multiple queries and responses back and forth with providers 215. The negotiations can be based on mandatory requirements and preferred characteristics associated with the installation resources. The mandatory requirements and preferred characteristics can be defined in the parameters received from the installer components or can be stored in the broker 210. The broker 210 may initially request installation resources that include all of the mandatory requirements and preferred characteristics. If none of the initial offers 240 and 250 satisfy all of the requested aspects, the broker 210 can negotiate with one or more providers 215 to identify a provider for each installation resource that can satisfy as many of the requested features but at least a minimum amount of the requested features.

Although the negotiation generally can be conducted automatically based on predefined policies, constraints, and conditions and predetermined rules for determining appropriate responses, some portions of the negotiations, such as an ultimate approval of a negotiated offer to provide installation resources, can also involve human interaction. For example, the broker 210 can display information on a user interface to receive user feedback or, alternatively, using a workflow system with user interface actions. One situation in which user interaction may be used is when there are several providers 215 that are offering similar installation resources. The user that provides feedback can be associated with the installer component 205 or the broker 210.

In some implementations, after the broker 210 receives installation resources from one or more providers 215, the broker 210 can store one or more of the received installation resources in a repository associated with the broker 210. The stored installation resource can then be used to respond to subsequent requests for the stored installation resource without having to again request the installation resource from external providers 215. In this type of implementation, one of the providers 215 (e.g., the first provider 215(1)) may be a local storage associated with the broker 210 that is used for storing previously requested installation resources. In some cases, the broker 210 can respond to a request for installation resources received from one or more installer components in a single target device by obtaining some of the requested installation resources from the local storage and requesting other installation resources from external providers 215.

In other implementations, requests from installer components 205 and actual provisioning of installation resources by the broker 210 are asynchronous, decoupled parts of the process 200. When an installer component 205 requests installation resources from the broker 210, the broker 210 does not immediately obtain and deliver the requested installation resources. Instead, the broker 210 waits until one or more other installer components request additional installation resources from the broker 210. The additional installation resources can be the same or different than those requested by the first installer component 205. According to certain rules, policies, and constraints, the broker 210 decides when to start requesting and negotiating for installation resources from the providers 215. When the broker 210 receives the requested installation resources, it delivers them to the requesting installer components.

In some cases, the broker 210 may need authorization to distribute multiple copies of particular installation resources. In such a case, the broker 210 may obtain multiple licenses from the providers 215 when requesting delivery of an installation resource. Alternatively, the broker 210 may request multiple copies of the installation resource and store the unused copies for responding to future requests. This technique can help reduce the number of requests sent to and negotiations conducted with providers 215.

When the broker 210 bundles the installation resources in 280, the broker 210 can transform the installation resources and repackage them in a different format before delivering the installation resources to the installer component 205. For example, the broker 210 may receive installation resources as a zip file, while the installer component 205 requests a certain delivery format, such as a signed and encrypted .zip file. As another example, the broker 210 can receive multiple different zip files, archive them all in a single zip file, and deliver the single file to the installer component.

Figure 3:
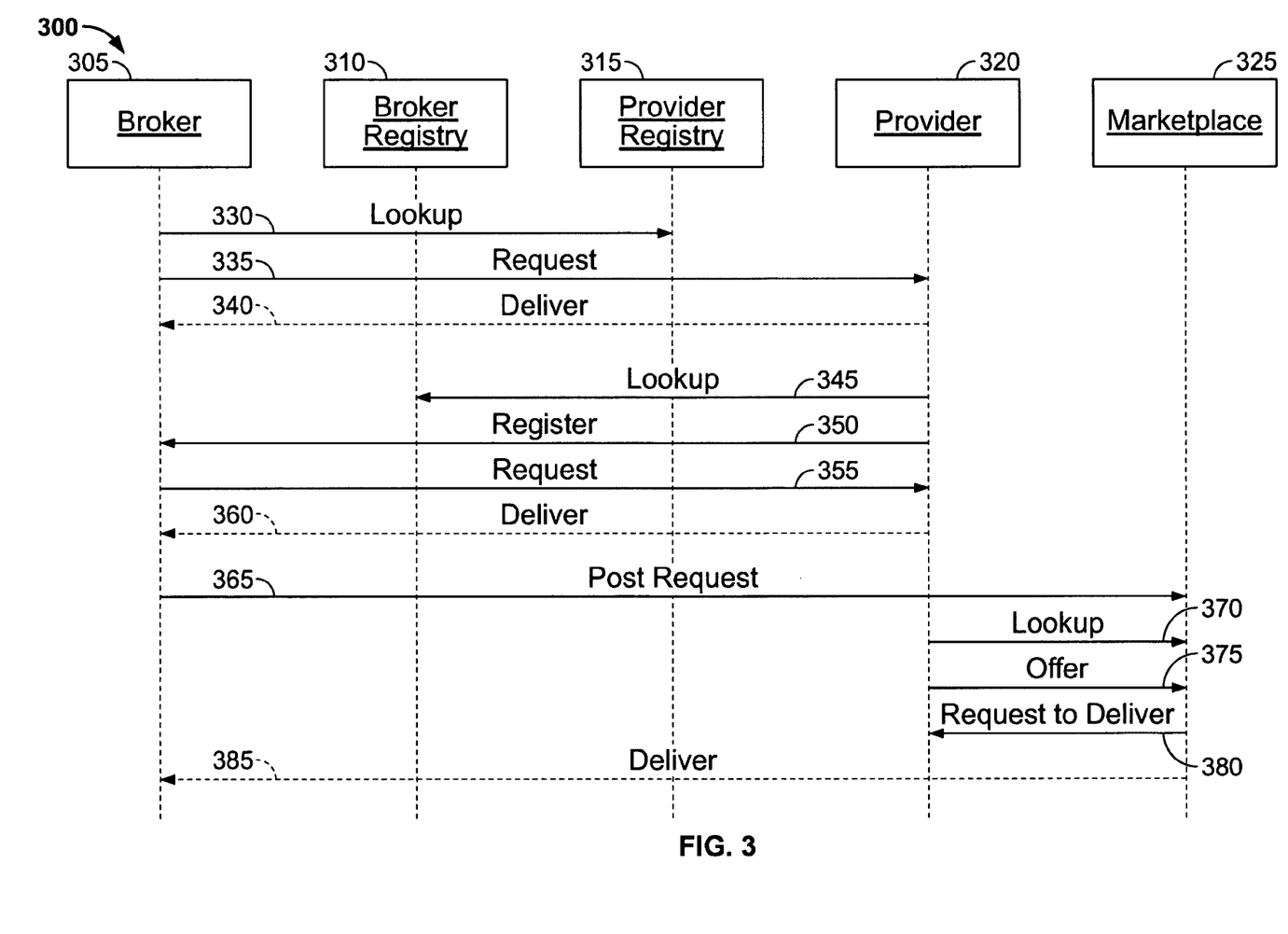
FIG. 3 is a signaling and flow diagram of a discovery process for enabling brokers and providers to negotiate a provisioning of installation resources.

FIG. 3 is a signaling and flow diagram of a discovery process 300 for enabling brokers and providers to negotiate a provisioning of installation resources. In one implementation, a broker 305 sends a lookup message 330 to a provider registry 315, which stores lists of providers 320 and how to contact them and allows brokers 305 to search for appropriate providers 320. Using information obtained in response to the lookup message 330, the broker 305 sends a request message 335 for particular installation resources to one or more appropriate providers 320, which can in turn send a delivery 340 of the requested installation resources.

In another implementation, a provider 320 can send a lookup message 345 to a broker registry 310 requesting information about available brokers 305. The broker registry 310 generally includes lists of brokers 305. The provider 320 can send a registration message 350 to a selected broker 305 to inform the broker 305 that the provider 320 is available to provide installation resources and/or to provide security credentials and other general information about the provider 320. Subsequently, the broker 305 sends a request message 355 for particular installation resources to one or more appropriate providers 320, which can in turn send a delivery 360 of the requested installation resources.

In yet another implementation, the broker 305 posts a request 365 for installation resources in an electronic marketplace 325. A provider 320 periodically sends a lookup message 370 to the electronic marketplace 325 to discover any pending installation resource requests. Based on information obtained as a result of the lookup message 370, the provider 320 sends an offer 375 to provide the requested installation resources to the electronic marketplace 325. The offer 375 can be posted, for example, in a private location of the electronic marketplace 325 that is only accessible to the broker 305. The broker 305 can view the one or more received offers, negotiate with the providers, and/or select which offers 375 the broker 305 wants to accept. As a result, a request to deliver 380 the offered installation resources is sent to the provider 320 from the electronic marketplace 325 (or from the broker 305), and the provider 320 sends a delivery 385 of the installation resources to the broker 305 directly or through the electronic marketplace 325.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 4:
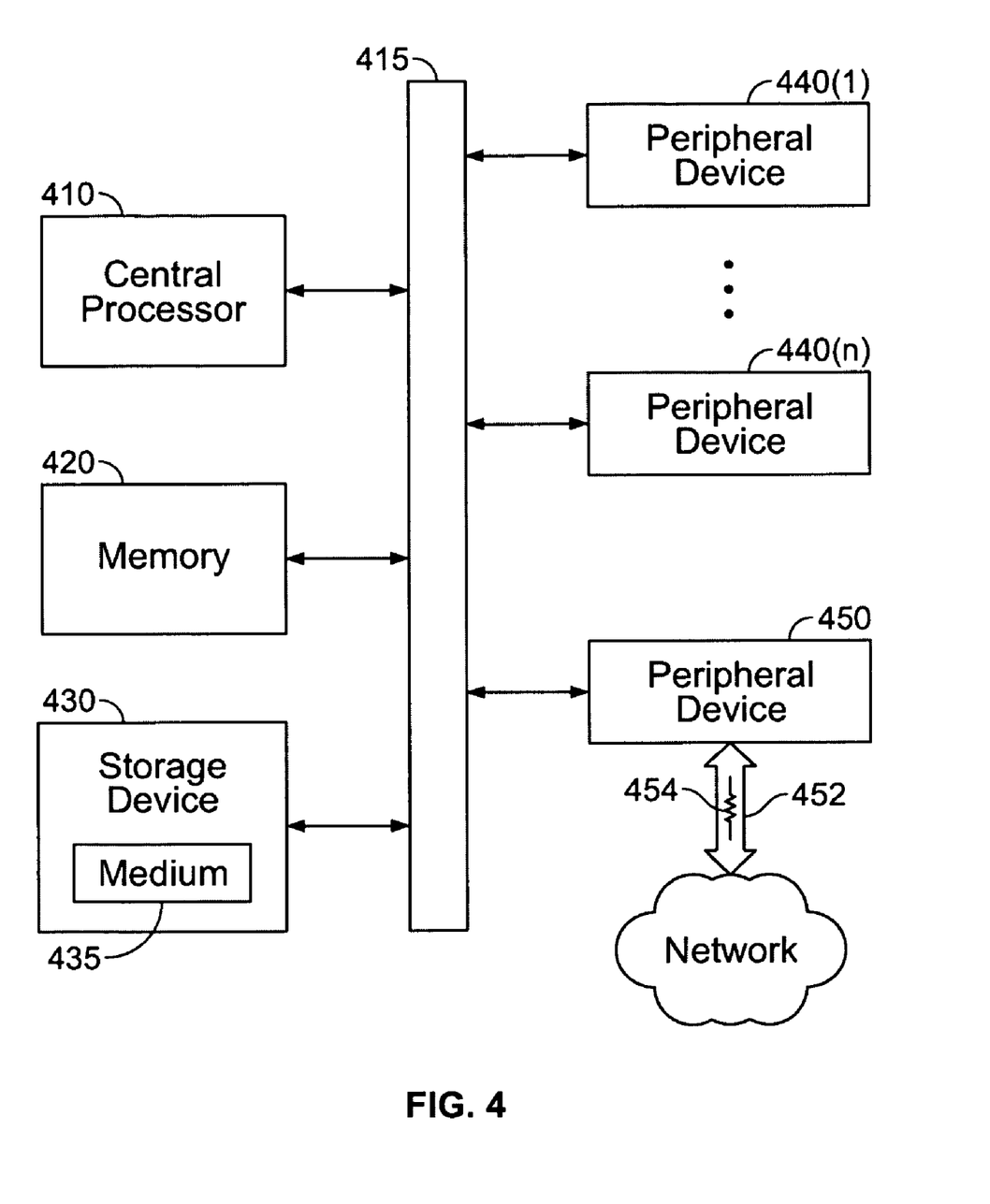
FIG. 4 is a block diagram illustrating an example data processing system in which a system for performing device authentication can be implemented.

FIG. 4 is a block diagram illustrating an example data processing system 400 in which a system for performing device authentication can be implemented. The data processing system 400 includes a central processor 410, which executes programs, performs data manipulations, and controls tasks in the system 400. The central processor 410 is coupled with a bus 415 that can include multiple busses, which may be parallel and/or serial busses.

The data processing system 400 includes a memory 420, which can be volatile and/or non-volatile memory, and is coupled with the communications bus 415. The system 400 can also include one or more cache memories. The data processing system 400 can include a storage device 430 for accessing a storage medium 435, which may be removable, read-only, or read/write media and may be magnetic-based, optical-based, semiconductor-based media, or a combination of these. The data processing system 400 can also include one or more peripheral devices 440(1)-440(n) (collectively, devices 440), and one or more controllers and/or adapters for providing interface functions.

The system 400 can further include a communication interface 450, which allows software and data to be transferred, in the form of signals 454 over a channel 452, between the system 400 and external devices, networks, or information sources. The signals 454 can embody instructions for causing the system 400 to perform operations. The system 400 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 400 and/or delivered to the machine 400 over a communication interface. These instructions, when executed, enable the machine 400 to perform the features and function described above. These instructions represent controllers of the machine 400 and can be implemented in a high-level procedural and/or object-oriented programming language, and/or in assembly/machine language. Such languages can be compiled and/or interpreted languages.

As used herein, the term "machine-readable medium" refers to any computer program product, apparatus, and/or device used to provide machine instructions and/or data to the machine 400, including a machine-readable medium that receives machine instructions as a machine-readable signal. Examples of a machine-readable medium include the storage medium 435, the memory 420, and/or PLDs, FPGAs, ASICs, and the like.

The invention has been described in terms of particular embodiments, but other embodiments can be implemented and are within the scope of the following claims. For example, the operations of the invention can be performed in a different order and still achieve desirable results. As one example, the process depicted in FIG. 2 does not require the particular order shown, or sequential order, to achieve desirable results (e.g., the operations 235-280 can be performed at many different places within the overall process). In certain implementations, multitasking and parallel processing may be preferable. Other embodiments are within the scope of the following claims

What is claimed is:

1. A method for delivering resources for installation on a machine, the method comprising:
   receiving a first request from one or more installer components for one or more requested installation resources;
   sending a second request, in response to the first request, for the one or more requested installation resources to a plurality of service providers;
   receiving one or more offers for one or more installation resources from at least one of the plurality of service providers, wherein the one or more offers for the one or more installation resources correspond to the one or more requested installation resources and are obtained as a result of the second request;
   negotiating with the at least one of the plurality of service providers to receive at least one modified offer for a particular installation resource;
   receiving one or more modified offers for the particular installation resource from at least one of the plurality of service providers;
   selecting one of the modified offers for the particular installation resource from a particular service provider based on one or more parameters associated with the selected modified offer;
   obtaining one or more installation resources from at least one of the plurality of service providers, wherein the obtained installation resources comprise at least the particular installation resource associated with the selected modified offer obtained from the particular service provider; and
   delivering the one or more obtained installation resources to the one or more installer components.

2. The method of claim 1 wherein the first request identifies parameters for defining the one or more installation resources and the one or more installation resources comply with the parameters.

3. The method of claim 1, wherein selecting one of the modified offers for the particular installation resource from a particular service provider based on one or more parameters associated with the modified offer comprises sending a message to a device that includes the one or more installer components to solicit an approval through a user interface of the one or more parameters associated with the selected modified offer for providing the installation resources.

4. The method of claim 1 wherein obtaining the one or more installation resources comprises:
   receiving a plurality of offers, with each offer relating to at least one of the one or more installation resources; and accepting at least one of the offers for each of the one or more installation resources.

5. The method of claim 1 wherein the one or more installer components comprise separate installers that generate separate requests for installation resources, with the separate requests collectively comprising the first request, the method further comprising bundling installation resources corresponding to each of the separate requests for delivery to the one or more installer components.

6. The method of claim 1 wherein:
the one or more requested installation resources comprise a plurality of separable resources;
obtaining the one or more installation resources comprises obtaining a first subset of the one or more installation resources from a first service provider and obtaining a second subset of the one or more installation resources from a second service provider; and
delivering the one or more installation resources comprises delivering the first subset and the second subset bundled together.

7. The method of claim 6 wherein obtaining the one or more installation resources is performed only after determining that all of the requested installation resources can be obtained.

8. The method of claim 1 further comprising:
storing at least one of the one or more installation resources in a cache;
receiving, from an installer component, a third request for installation resources;
determining that the third request can be at least partially fulfilled using at least one of the stored installation resources; and
retrieving the at least one of the stored installation resources for delivery to the installer component in response to the third request.

9. The method of claim 8 wherein obtaining one or more installation resources comprises obtaining authorization to distribute multiple copies of at least one of the stored installation resources.

10. A system for delivering resources for installation on a machine, the system comprising:
memory; and
a data processing apparatus communicably coupled to the memory, the data processing apparatus operable to:
receive, from an installer component, a first request for a requested installation resource;
send a second request, in response to the first request, for the requested installation resource to one or more remote service providers;
receive two or more offers for a particular installation resource, with each offer received from a different source, and with each source selected from the group consisting of at least one of the remote service providers and a local storage, wherein the installation resource corresponds to the requested installation resource and is received as a result of the second request, and wherein each offer is associated with one or more parameters;
select a particular offer for the particular installation resource received from a particular one of the multiple sources based at least in part on one or more parameters associated with the particular offer;
obtain the particular installation resource from the particular one of the multiple sources associated with the selected offer; and
deliver the obtained installation resource to the installer component.

11. The system of claim 10 wherein the data processing apparatus is further operable to negotiate with the one or more remote service providers by:
sending a request to at least one of the one or more remote service providers requesting a modification to at least one of the parameters associated with at least one of the received offers for the particular installation resource;
receiving at least one modified offer for the particular installation resource from the at least one of the one or more remote service providers, the at least one modified offer associated with at least one modified parameter; and
selecting one of the received modified offers for the particular installation resource based at least in part on the at least one modified parameter.

12. The system of claim 10 wherein the data processing apparatus is further operable to perform at least one of:
discovering remote service providers;
posting information identifying requested installation resources, with the posted information discoverable by remote service providers; or
posting identification information associated with obtaining one or more installation resources, with the identification information discoverable by remote service providers.

13. The system of claim 10 wherein the data processing apparatus comprises a broker device that is operable to perform the operations of receiving the first request, sending the second request, receiving the two or more offers for the particular installation resource, selecting the particular one of the offers for the particular installation resource based at least in part on one or more parameters associated with the particular offer, obtaining the particular installation resource from the particular one of the multiple sources associated with the selected offer, and delivering the particular installation resource to the installer component.

14. The system of claim 13 wherein the broker device is further operable to perform at least one of:
validating at least one of the installer component or the first request; or
managing payment information for the particular installation resource.

15. The system of claim 10 wherein the data processing apparatus is farther operable to cache the particular obtained installation resources for delivery to installer components in response to additional requests for the particular installation resource.

16. A computer program product, tangibly embodied in a machine-readable storage device, for delivering resources for installation on a machine, the computer program product being operable to cause data processing apparatus to:
receive a first request from one or more installer components for requested installation resources;
send a set of second requests, in response to the first request, for the requested installation resources, with each second request in the set of second requests sent to one of a plurality of service providers;
receive a first subset of offers for installation resources from a first one of the plurality of service providers in response to one of the plurality of second requests, wherein the first subset of offers for installation resources corresponds to a first set of the requested installation resources;
receive a second subset of offers for installation resources from a second one of the plurality of service providers in response to another of the plurality of second requests, wherein the second subset of offers for installation resources corresponds to a second set of the requested installation resources, wherein the first set of requested installation resources includes at least one installation resource included in the second set of requested installation resources;

negotiate with the first one of the plurality of service providers to request a modified subset of offers for at least one installation resource included only the in the first set of requested installation resources;

receive a third subset of offers for installation resources from the first one of the plurality of service providers in response to the negotiation, wherein the third subset of offers corresponds to a third set of requested installation resources included only in the first set of requested installation resources;

obtain the third set of requested installation resources from the first one of the plurality of service providers and the second set of requested installation resources from the second one of the plurality of service providers;

bundle the third set of obtained installation resources and the second set of obtained installation resources to generate bundled installation resources; and deliver the bundled installation resources to the one or more installer components.

17. The computer program product of claim 16 wherein the requested installation resources are defined by mandatory parameters defining required features of the requested installation resources and optional parameters defining preferred features of the requested installation resources, the computer program product being operable to cause data processing apparatus to further:

negotiate with the plurality of service providers to obtain installation resources including the required features; and negotiate with the plurality of service providers to attempt to obtain installation resources including at least a portion of the preferred features.

18. The computer program product of claim 17 wherein the computer program product is operable to cause data processing apparatus to further:

request an approval of proposed installation resources from a user; and receive an approval of the proposed installation resources from the user in response to the request for approval prior to delivering the bundled installation resources.

19. The computer program product of claim 17 wherein:

the set of second requests is sent in response to at least one other request received from additional installer components for additional installation resources; and at least one of the first subset of installation resources and the second subset of installation resources comprise the additional installation resources.

* * * * *